United States Patent
Biswas et al.

(10) Patent No.: US 11,677,804 B2
(45) Date of Patent: Jun. 13, 2023

(54) DETERMINING APPROPRIATE APPLICATION OF PULL OR PUSH COMMUNICATION REQUEST TYPES FOR CLIENT SERVER CALLS

(71) Applicant: INTERNATIONAL BUSINESS MACHINES CORPORATION, Armonk, NY (US)

(72) Inventors: Pijush Kanti Biswas, New Delhi (IN); Abhishek Kumar Gautam, Delhi (IN); Biswajit Mohapatra, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/495,404

(22) Filed: Oct. 6, 2021

(65) Prior Publication Data

US 2023/0108726 A1    Apr. 6, 2023

(51) Int. Cl.
| | | |
|---|---|---|
| H04L 12/26 | (2006.01) | |
| H04L 29/06 | (2006.01) | |
| H04L 67/01 | (2022.01) | |
| H04L 67/02 | (2022.01) | |
| H04L 67/55 | (2022.01) | |
| G06F 3/16 | (2006.01) | |

(52) U.S. Cl.
CPC ............ *H04L 67/01* (2022.05); *H04L 67/02* (2013.01); *H04L 67/55* (2022.05)

(58) Field of Classification Search
USPC ........................................... 709/203
See application file for complete search history.

(56) References Cited

U.S. PATENT DOCUMENTS

| | | | |
|---|---|---|---|
| 8,156,240 B2 | 4/2012 | Silberstein et al. | |
| 2002/0095454 A1* | 7/2002 | Reed | H04L 67/51 709/212 |
| 2007/0260673 A1 | 11/2007 | Shenfield et al. | |
| 2017/0180238 A1* | 6/2017 | Telle | G06F 11/3664 |
| 2018/0109597 A1 | 4/2018 | Kim et al. | |
| 2018/0139600 A1* | 5/2018 | Kim | H04W 52/0216 |
| 2018/0247654 A1* | 8/2018 | Bhaya | G06F 40/205 |

OTHER PUBLICATIONS

Bozdag, Engin, et al., "A comparison of push and pull techniques for ajax," 2007 9th IEEE International Workshop on web site evolution, IEEE, Oct. 2007, 12 pages.

(Continued)

*Primary Examiner* — Jude Jean Gilles
(74) *Attorney, Agent, or Firm* — Tutunjian & Bitetto, P.C.; Michael A. Petrocelli

(57) ABSTRACT

Determining network communication parameters by analyzing network packets at the communication endpoints to determine number of requests and responses; and determining from the number of requests and responses which are follow up requests. The follow up requests are characterized as communications being performed with a pull model. Notifications are provided of applications employing pull model communications with the client for conversion to push model.

20 Claims, 6 Drawing Sheets

(56) References Cited

OTHER PUBLICATIONS

Bagchi, Amitabha, et al., "Achieving communication efficiency through push-pull partitioning of semantic spaces to disseminate dynamic information," IEEE Transactions on Knowledge and Data Engineering, Aug. 2006, pp. 1352-1367, 18, 10.

Bhide, Manish, et al., "Adaptive push-pull: Disseminating dynamic web data.," IEEE Transactions on Computers, Aug. 2002, pp. 652-668, 51, 6.

Mell, Peter, et al., "The NIST Definition of Cloud Computing," Sep. 2011, 7 pages.

\* cited by examiner

DETERMINING APPROPRIATE APPLICATION OF PULL OR PUSH COMMUNICATION REQUEST TYPES FOR CLIENT SERVER CALLS

BACKGROUND

The present disclosure generally relates to computer networks, and more particularly to managing strategies for implementing push and pull communication requests through computer networks.

Modernizing legacy applications is an ongoing interest in computing applications. To modernize a client's application it is critical to identify each aspect of the application. The communication model is one aspect for consideration when running legacy applications. In some instances, contemporary applications include components that have started supporting notification services, which are not available as a functionality for many legacy applications. It has been determined that a majority of legacy applications are using a continuous pull request when the application is expecting a change in communications, or an external application, or being employed in a database. Pull requests consume significant resources from the central processing unit (CPU) and network at both the ends of a line of communication.

SUMMARY

In accordance with one aspect of the present disclosure, a computer-implemented method for determining network communication parameters is described that includes analyzing network packets at the communication endpoints to determine number of requests and responses; determining from the number of requests and responses which are follow up requests; characterizing the follow up requests as communications being performed with a pull model; and providing notifications of applications employing pull model communications with the client for conversion to push model.

In another aspect, a system is described for determining network communication parameters. The system may include a hardware processor; and memory that stores a computer program product. The computer program product when executed by the hardware processor, causes the hardware processor to analyze network packets at the communication endpoints to determine number of requests and responses; and determine from the number of requests and responses which are follow up requests. The computer program product when executed by the hardware processor can also characterize the follow up requests as communications being performed with a pull model; and provide notifications of applications employing pull model communications with the client for conversion to push model.

In another aspect, a computer program product for determining network communication parameters comprising a computer readable storage medium having computer readable program code embodied therewith, the program instructions executable by a processor to cause the processor to analyze network packets at the communication endpoints to determine number of requests and responses. The computer program product can also determine from the number of requests and responses which are follow up requests. The computer program product can also characterize, using the processor, the follow up requests as communications being performed with a pull model; and provide, using the processor, notifications of applications employing pull model communications with the client for conversion to push model.

BRIEF DESCRIPTION OF THE DRAWINGS

The following description will provide details of preferred embodiments with reference to the following figures wherein.

DETAILED DESCRIPTION

Figure 1:
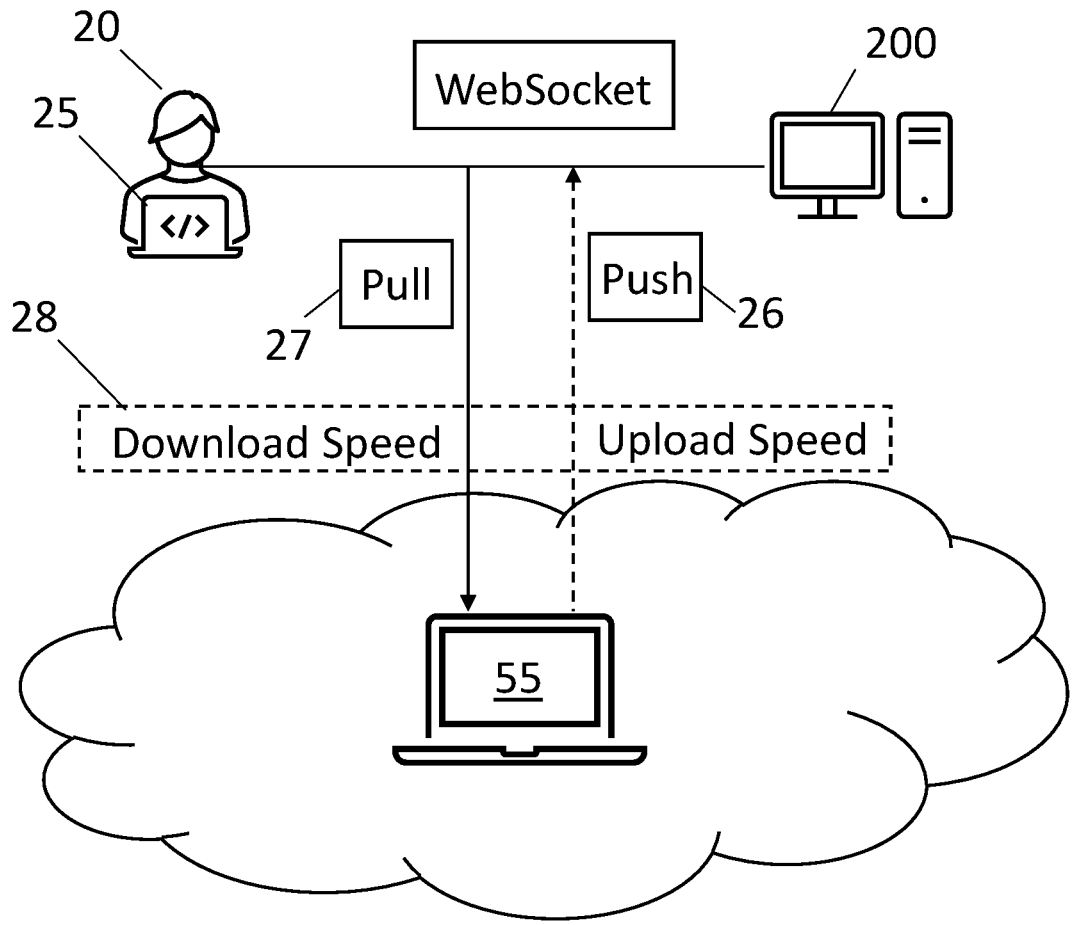
FIG. 1 is an illustration of an example environment illustrating network communication using push and pull methodologies, in accordance with some embodiments of the present disclosure.

The methods, systems, and computer program products described herein relate to methods and systems for identifying the appropriate strategy for push and pull methodologies for client/server calls. "Push" technology, or server push, is a style of Internet-based communication where the request for a given transaction is initiated by the publisher or central server. It is contrasted with "pull" technology, also referred to as pull/get, where the request for the transmission of information is initiated by the receiver or client.

"Push" services are often based on information preferences expressed in advance. This is called a publish/subscribe model. A client "subscribes" to various information "channels" provided by a server; whenever new content is available on one of those channels, the server pushes that information out to the client. The server pushes data to clients. "Pull" coding or client pull is a style of network communication where the initial request for data originates from the client, and then is responded to by the server.

The methods, systems and computer program products that are described herein detect requests for push and pull requests, and propose a notification service instead of executing an immediate push and/or pull function. The notification service can provide which is the best strategy, e.g., either push or pull, between two endpoints of a network when a client wants to communicate over server components. In a web-based network component, the browser keeps the connections live.

In some embodiments, a browser works on a pull mechanism using HTML format, and is served by the HTTP protocol. "HTML" is a HyperText Markup Language file format used as the basis of a web page. HTML is a file extension used interchangeably with HTM. HTML consists of tags surrounded by angle brackets. The HTML tags can be used to define headings, paragraphs, lists, links, quotes, and interactive forms.

Websocket enables the browser to receive a push back when there is a content change on the server side of the network. "WebSocket" is a computer communications protocol, providing full-duplex communication channels over a single TCP connection. The WebSocket protocol was standardized by the IETF as RFC 6455, and the WebSocket application program interface (API) in Web IDL is being standardized by the world wide web consortium (W3C). "Web IDL" is an interface description language format for describing application programming interfaces that are intended to be implemented in web browsers. WebSocket is distinct from HTTP. WebSocket gets a notification from the server that a content has changed. The content of a browser can be updated by server events.

The methods, systems and computer program products of the present disclosure can enable the browser and the underlying framework to decide best options to choose from as with as either a push model or a pull model based on parameters, such as network condition, download speed, upload speed and request frequency. A "web browser" (commonly referred to as a browser) is application software for accessing the World Wide Web. When a user requests a web page from a particular website, the web browser retrieves the necessary content from a web server and then displays the page on the user's device. A web framework (WF) or web application framework (WAF), e.g., the underlying framework from the browser, is a software framework that is designed to support the development of web applications including web browsers, web services, web resources, and web APIs. Web frameworks provide a standard way to build and deploy web applications on the World Wide Web. Web frameworks aim to automate the overhead associated with common activities performed in web development. For example, many web frameworks provide libraries for database access, templating frameworks, and session management, and they often promote code reuse.

Many frameworks follow the MVC architectural pattern to separate the data model with business rules from the user interface. This is generally considered a good practice as it modularizes code, promotes code reuse, and allows multiple interfaces to be applied. In web applications, this permits different views to be presented, such as web pages for humans, and web service interfaces for remote applications.

Most MVC frameworks follow a push-based architecture also called "action-based". These frameworks use actions that do the required processing, and then "push" the data to the view layer to render the results. The alternative to this is pull-based architecture, sometimes also called "component-based". These frameworks start with the view layer, which can then "pull" results from multiple controllers as needed. In this architecture, multiple controllers can be involved with a single view. The methods, systems and computer program products are now described in greater detail with reference to FIGS. 1-6.

Figure 2:
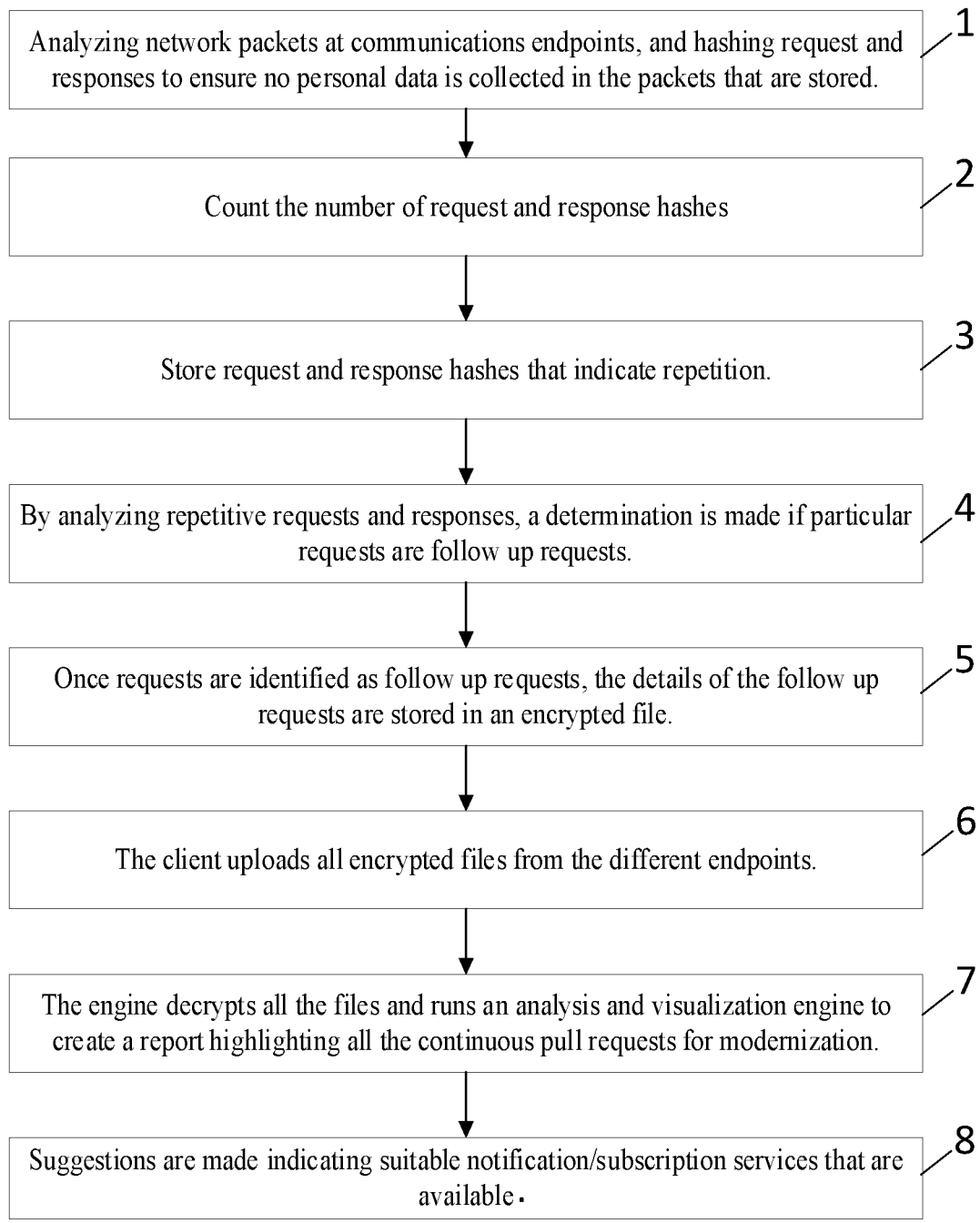
FIG. 2 is a flow/block diagram showing one embodiment a method for identifying the appropriate strategy for push and pull methodologies for client/server calls, in accordance with some embodiments of the present disclosure.
Figure 3:
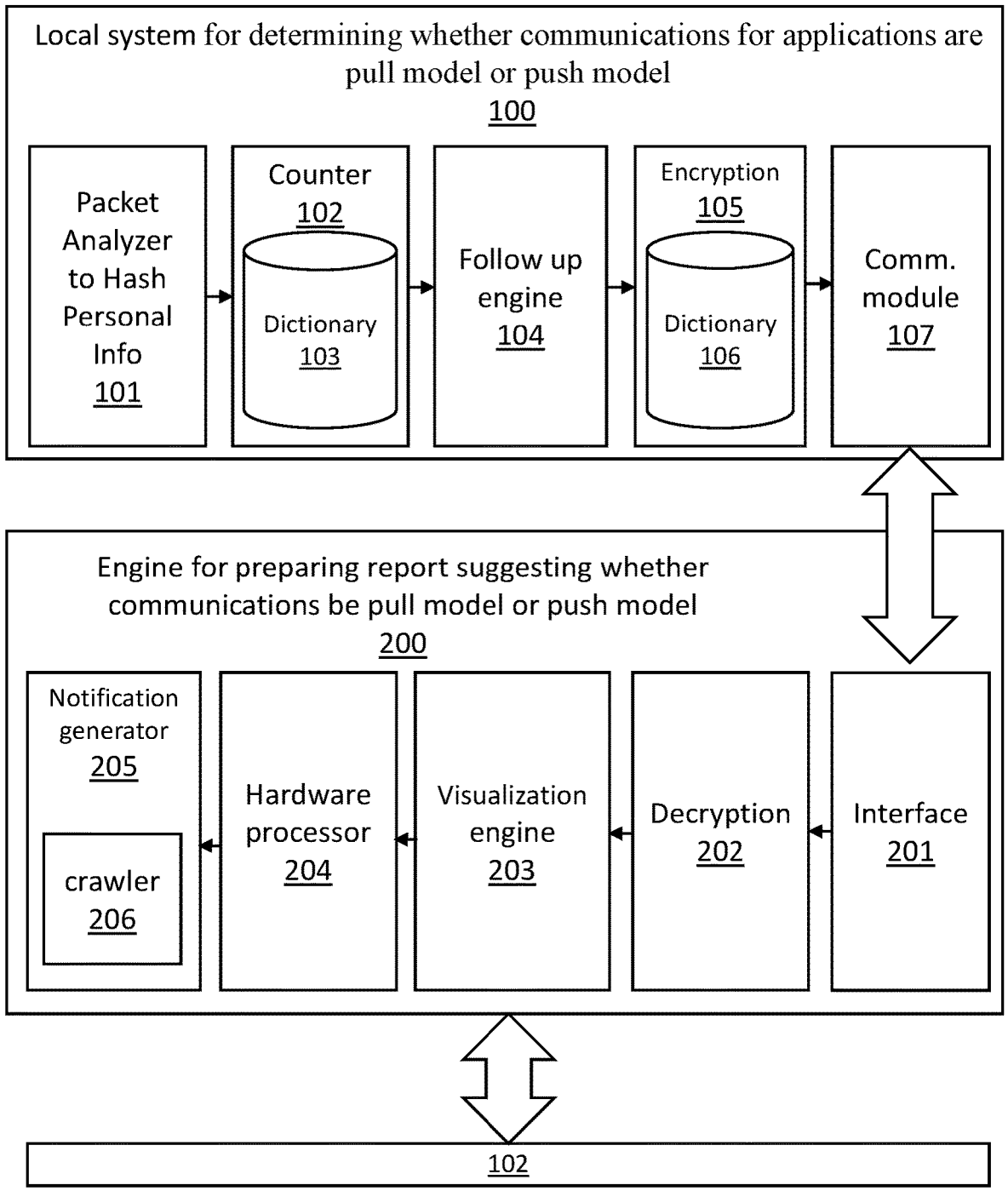
FIG. 3 is a block diagram depicting one embodiment of a system for identifying the appropriate strategy for push and pull methodologies for client/server calls, in accordance with some embodiments of the present disclosure.

FIG. 1 is an illustration of an example environment illustrating network communication using push and pull methodologies. FIG. 2 is a flow/block diagram showing one embodiment a method for identifying the appropriate strategy for push and pull methodologies for client/server calls. FIG. 3 is a block diagram depicting one embodiment of a system for identifying the appropriate strategy for push and pull methodologies for client/server calls, which can be employed in the method described with reference to FIG. 2.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 1, an internet-based environment is depicted in which a cloud-based application 55 is being run. A user 20 operates through an interface 25 to the application 55. The present disclosure provides a push-pull notification system 200 that detects requests from the user interface 25, and determines the best strategy for communication between two endpoints when a client wants to communicate over server components. For example, the user 20 can enable the browser and the underlying framework being employed by the interface 25 to decide best options to choose from as with as either a push model 26 or a pull model 27 for requests based on parameters 28, such as network condition, download speed, upload speed and request frequency.

For example, if a client, e.g., user 20, is making requests (to an application) very frequently for similar content repeatably, then the connection direction can be reviewed and in place of pull methods, the push method can be implemented. In some embodiments, the system 200 may generate a notification report illustrating which applications are suitable for push and pull models. In some embodiments, the system 200 can reconfigure client, server and application interactions to provide a push model when appropriate.

FIG. 2 illustrates one embodiment of a method for determining whether a push or pull method is to be implemented. The method depicted in FIG. 2 can provide an analysis of legacy applications, and illustrate which of the legacy applications have been running with continuous pull requests, so that the legacy application can be modernized, e.g., converted to a push request module in a cloud environment.

The method provides a script that can analyze network packets at the communication endpoints. A "packet" is the unit of data routed between an origin and a destination on the internet or other packet-switched network—or networks that ship data around in small packets. A "script" is a set of commands that are executed by the operating system or application.

In some embodiments, the method can begin with analyzing the network packets at block 1 to hash the requests to ensure that no person information is gathered in the packets and stored as output files. The method can also store endpoint details. Referring to FIG. 3, the system 100 for providing notifications of whether a push or pull model is to be employed may include a packet analyzer 101 for the purpose of hashing the person the person information from the packets being analyzed.

Referring to FIG. 2, at block 2, the method can continue with counting the number of request and response hashes, which can be stored in a dictionary 103. Referring to FIG. 3, the system 100 may include a counter 102 for counting the number of request and response hashes, and the dictionary 103, which can be a form of memory storage.

Referring to FIG. 2, based on a repetitive request and responses, the method can identify if the requests are a regular follow-up request. First, at block 3, the method stores request and response hashes that indicate repetition. At block 4, by analyzing the repetitive requests and responses, a determination is made if a particular request is a follow up request. A "follow up" request is a request by the same client to the same application over multiple instances. Blocks 3 and 4 of the method depicted in FIG. 2 can be provided by a request characterizing engine for determining follow up requests 104 of the system depicted in FIG. 3.

Once, the requests are identified as follow up requests, the method logs the details to a file and encrypts the details at block 5. Block 5 of the method depicted in FIG. 2 can be provided by an encryption engine 105 for encrypting the files indicating which types of communications are follow up requests. The storage for storing the encrypted data representative of the follow up requests for each communication type is identified by reference number 106. The encrypted data for each communication type, e.g., each follow up response to an application, can be stored in one form of storage media.

At block 7 of the method depicted in FIG. 2, the client is asked to upload all those encrypted files from different endpoints to a . Blocks 1-6 of the method depicted in FIG. 2 can be performed locally at the client 20, e.g., through the device that provides the user interface 25 of the client 20.

For example, the user interface 25 may be provided by a personal computing device having access to the internet. The personal computing device may be a mobile computing device. The local component of the system 100 may have an interface, e.g., communications module 107, for communicating with a continuous pull request monitor of a remote system, e.g., cloud based system, as depicted in FIG. 3. The communications module 107 may provide for internet based communication with the engine 200 for suggesting whether communications should be handled using a pull model or push model.

Still referring to FIG. 3, the engine 200 for suggesting whether communications should be handled using a pull model or push model also includes interface 201 for communicating with the communications module 107 of the interface 25 with the client 20. At block 8 of the method depicted in FIG. 2, the engine 200 for suggesting whether communications should be handled using a pull model or push model can then decrypt all the files that were uploaded, and runs an analysis and visualizing engine 203. Referring to FIG. 3, a decryption module 202 may be a component of the engine 200 for suggesting whether communications should be handled using a pull model or push model.

Still referring to FIG. 3, the engine 200 for suggesting whether communications should be handled using a pull model or push model incudes at least one hardware processor 204 and memory. The memory may be integrated into some of the components of the engine 200, such as the decryption module 202 and the visualizing engine 203. The memory stores a set of instructions for performing the operation of the desired components, e.g., the decryption module 202 includes a set of instructions for decrypting the encrypted files, and the visualizing engine 203 includes memory storing a set of instructions for determining, which communications would benefit from being switched from a continuous pull request to a push request model. The instructions stored in the memory are executed by a hardware processor 204 for executing the functions that result from the instructions stored on the memory.

As employed herein, the term "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor—or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

At block 8 of the method depicted in FIG. 2, following decryption of the files received, which includes data on which communications include follow up requests, the analysis and visualizing engine 203 of the engine 200 for suggesting whether communications should be handled using a pull model or push model can create a report highlighting all continuous pull requests for modernization. More specifically, the report indicates what communications to applications are indicative of applications that can be changed from the pull model for requests to a push model for requests. This can be part of a process for converting legacy local run applications to a cloud computing environment.

The visualizing engine 203 translates large data sets and metrics into charts, graphs and other visuals indicating which applications are requiring continuous pull requests. The translation steps for the visualization engine 203 may be carried out using artificial intelligence (AI). The artificial intelligence (AI) method can include decision tree learning, association rule learning, artificial neural networks, deep learning, inductive logic programming, support vector machines, clustering analysis, bayesian networks, reinforcement learning, representation learning, similarity and metric learning, sparse dictionary learning, genetic algorithms, rule-based machine learning, learning classifier systems, and combinations thereof. The remote predictive light setting computing system using machine learning produces a model for providing predictive light characteristics in response to environmental inputs, such as time, weather and calendar date may include a machine learning algorithm that can be selected from the group consisting of: Almeida-Pineda recurrent backpropagation, ALOPEX, backpropagation, bootstrap aggregating, CN2 algorithm, constructing skill trees, dehaene-changeux model, diffusion map, dominance-based rough set approach, dynamic time warping, error-driven learning, evolutionary multimodal optimization, expectation-maximization algorithm, fastICA, forward-backward algorithm, geneRec, genetic algorithm for rule set production, growing self-organizing map, HEXQ, hyper basis function network, IDistance, K-nearest neighbors algorithm, kernel methods for vector output, kernel principal component analysis, leabra, Linde—Buzo—Gray algorithm, local outlier factor, logic learning machine, LogitBoost, manifold alignment, minimum redundancy feature selection, mixture of experts, multiple kernel learning, non-negative matrix factorization, online machine learning, out-of-bag error, prefrontal cortex basal ganglia working memory, PVLV, Q-learning, quadratic unconstrained binary optimization, query-level feature, quickprop, radial basis function network, randomized weighted majority algorithm, reinforcement learning, repeated incremental pruning to produce error reduction (RIPPER), Rprop, rule-based machine learning, skill chaining, sparse PCA, state—action—reward—state—action, stochastic gradient descent, structured kNN, T-distributed stochastic neighbor embedding, temporal difference learning, wake-sleep algorithm, weighted majority algorithm (machine learning) and combinations thereof.

In some embodiments, the visualizing engine 203 translates large data sets and metrics into charts, graphs and other visual representations of data that can make it easier to identify whether communications should be handled using a pull model or push model.

For example, the visualization engine 203 may produce a dashboard. The dashboard is an information visualization tool that can monitor events or activities at a glance by providing insights on one or more pages or screens. Unlike an infographic, which presents a static graphical representation, a dashboard conveys real-time information by pulling complex data points directly from large data sets.

Referring back to FIG. 2, in some embodiments, the method may continue to block 9. Block 9 includes suggestions being made indicating suitable notification/subscription services that are available. For example, at block 9, the system can make a suggestion of available services on the cloud for providing the push model on legacy applications being converted to the push model. The engine can also suggest suitable notification/subscription service available on the target cloud, based on the pull request type. For example, a request continuously sent to database, database notification service can be suggested. For a continuous API requesting, it will suggest the target API endpoint code to be refactored to provide notification service. The notification service may be a cloud service for coordinating the delivery of push messages from software applications to subscribing endpoints and clients.

Referring to FIG. 3, to provide a notification service request at block 9, the engine 200 for suggesting whether communications should be handled using a pull model or push model may include notification generator 205 that includes a web crawler 206. A crawler is a computer program that automatically searches documents on the Web. In some embodiments, a crawler looks for information on the Web, which it assigns to certain categories, and then indexes and catalogues it so that the crawled information is retrievable and can be evaluated.

In computer science, request-response or request-reply is one of the basic methods computers use to communicate with each other in a network, in which the first computer sends a request for some data and the second responds to the request. More specifically, it is a message exchange pattern in which a requestor sends a request message to a replier system, which receives and processes the request, ultimately returning a message in response. This is a simple but powerful messaging pattern which allows two applications to have a two-way conversation with one another over a channel; it is especially common in client-server architectures. A client is a computer or computer-controlled device that provides a user with access to a network. Clients are user-facing computers that run software to make requests to servers, and either interpret or display the responses. In particular, a client sends a request to the server. A server is a system that provides services to other systems in its network. There are file servers, boot servers, database servers, license servers, print servers, installation servers, and even servers for particular application.

AJAX uses both a browser built-in XMLHttpRequest object to get data from the web server and JavaScript and HTML DOM to display that content to the user. Despite the name "AJAX" these calls can also transport data as plain text or JSON instead of XML. AJAX calls use a JavaScript snippet to load dynamic content. AJAX is a pull methodology.

In contrast, one-way computer communication, which is like the push methodology or "barge in", sends a message without waiting for a response. Unlike HTTP, where you have to constantly request updates, with Websockets, updates are sent immediately when they are available. WebSockets keeps a single, persistent connection open while eliminating latency problems that arise with HTTP request/response-based methods.

The methods, systems and computer programs described with reference to FIGS. 1-3 can improve network utilization by choosing the right method of communication. In some examples, the methods, systems and computer program products can select the right strategy for different application components communications. For example, the methods and systems can select the correct strategy for Websocket communication. The methods and systems are independent of AJAX implementation for a single page application (SPA). A single-page application (SPA) is a web application or website that interacts with the user by dynamically rewriting the current web page with new data from the web server, instead of the default method of a web browser loading entire new pages. The goal is faster transitions that make the website feel more like a native app. In a SPA, a page refresh never occurs; instead, all necessary HTML, JavaScript, and CSS code is either retrieved by the browser with a single page load, or the appropriate resources are dynamically loaded and added to the page as necessary, usually in response to user actions. The page does not reload at any point in the process, nor does it transfer control to another page, although the location hash or the HTML5 History API can be used to provide the perception and navigability of separate logical pages in the application.

The methods, systems and computer program products determine the appropriate communication type, e.g., push methodology or pull methodology, by analyzing packets from the client, and determining repetitive request and responses indicative of a pull methodology, which is a mechanism to produce deliverables that does not require access to endpoint details, endpoint credentials or the endpoint virtual private network (VPN).

In one example, the packets are analyzed to identify the request pattern and direction of request. The following are possibilities in some embodiments of the methods, and systems that are described herein. In a scenario in which a client "A" is making a call to server B; and server "B" responds to client "A", the following is a use case:

a) If there are 100 requests per second between the client and server, b) 40 requests are targeted to same endpoints, methods and parameters, c) The response of 40 requests are of similar return type, d) Average response times are calculated for 100 calls as "C", e) Average response times are calculated for 40 calls as "D", f) If D is greater than C, the pull method should be replaced with push method for 40 calls, g) On push methods, the containers are updated.

h) On push method it can further, it can further reduce the call from 40 to 10 calls (i.e., reduce 25% of all calls). The reduction illustrated by the above use case can help to reduce network traffic and resource utilization.

Figure 4:
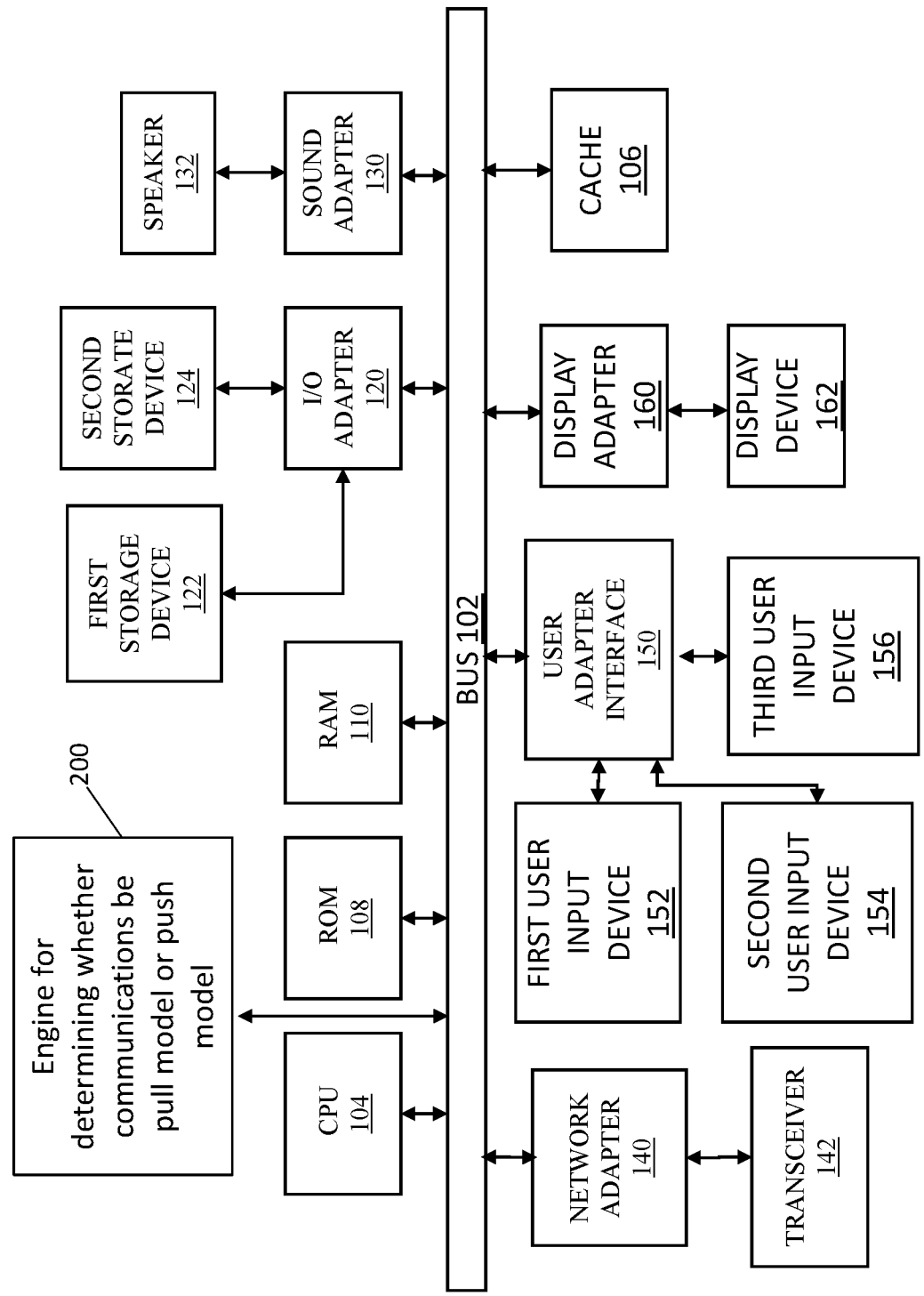
FIG. 4 is a block diagram illustrating a system that can incorporate the system for identifying the appropriate strategy for push and pull methodologies for client/server calls that is depicted in FIG. 3, in accordance with one embodiment of the present disclosure.

FIG. 4 illustrates a processing system 400 used by or comprised by the system 200 of FIG. 3 for determining to implement push or pull type models, in accordance with the methods and systems described above in FIGS. 1-3. The bus 102 interconnects the plurality of components for the system 200 described above with the components depicted in the computer system 400 depicted in FIG. 4.

The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The processing system 400 depicted in FIG. 4, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400, which can include the system 100 for reducing cross contamination.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

While FIG. 4 shows the computer system 400 as a particular configuration of hardware and software, any configuration of hardware and software, as would be known to a person of ordinary skill in the art, may be utilized for the purposes stated supra in conjunction with the particular computer system 100 of FIG. 4. For example, the memory devices 94 and 95 may be portions of a single memory device rather than separate memory devices.

The present invention may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In one embodiment, the present disclosure provides a non-transitory computer readable storage medium that includes a computer readable program for determining network communication parameters. The non-transitory computer readable program when executed on a computer causes the computer to perform the steps of analyzing network packets at the communication endpoints to determine number of requests and responses. The computer program product can also determine from the number of requests and responses which are follow up requests. The computer program product can also characterize, using the processor, the follow up requests as communications being performed with a pull model; and provide, using the processor, notifications of applications employing pull model communications with the client for conversion to push model.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment (e.g., Internet of thing (IOT)) now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing.

capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 5:
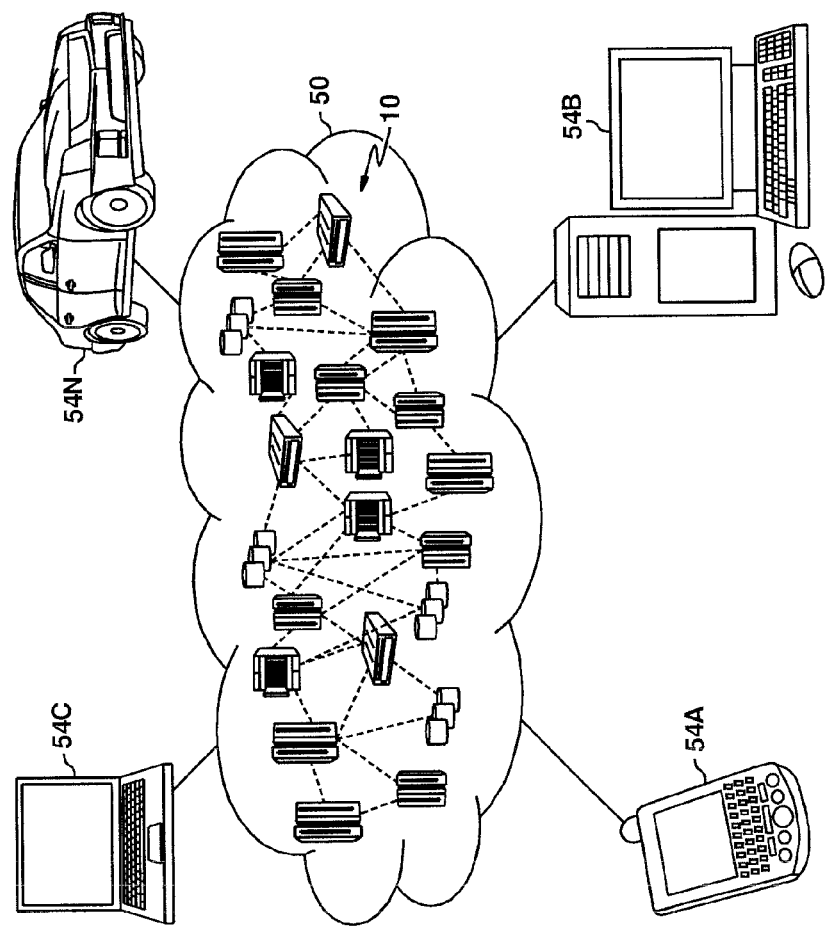
FIG. 5 depicts a cloud computing environment according to an embodiment of the present disclosure.

Referring now to FIG. 5, illustrative cloud computing environment is depicted. As shown, cloud computing environment includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
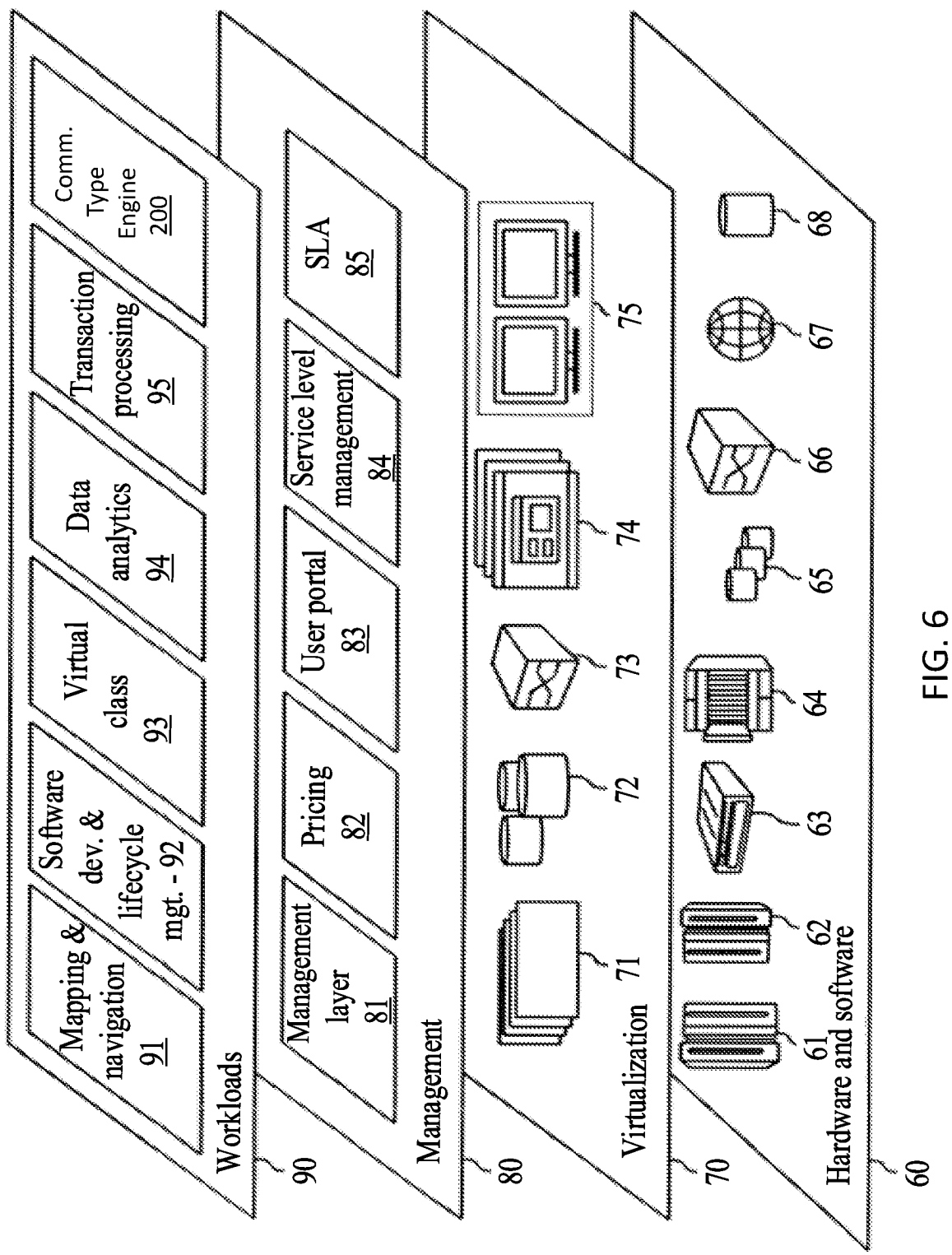
FIG. 6 depicts abstraction model layers according to an embodiment of the present disclosure.

Referring now to FIG. 6, a set of functional abstraction layers provided by cloud computing environment (see FIG. 5) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for a cognitive recognition model to maximize the business impact 96 in hardware devices in accordance with FIGS. 1-6.

Having described preferred embodiments of a system and method for identifying the right strategy for pull or push method for server call (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for determining network communication parameters comprising:
    analyzing network packets at communication endpoints to determine number of requests and responses;
    determining from the number of requests and responses which are follow up requests;
    characterizing the follow up requests as communications being performed with a pull model; and issuing notifications of applications employing pull model communications with the client for conversion to push model for client/server call.

2. The computer-implemented method of claim 1, wherein the analyzing of network packets further comprising hashing to remove personal information from the network packets.

3. The computer-implemented method of claim 1, wherein the number of requests and responses are stored in a dictionary.

4. The computer-implemented method of claim 1, wherein the determining from the number of requests and responses which are the follow up requests includes determining repetition in the responses and requests.

5. The computer-implemented method of claim 1, wherein elements of the analyzing the network packets and determining the number of follow up requests is performed locally at the computing device of the client, and elements of the characterizing the follow up requests and the providing notifications of applications employing pull model communications to the client is performed in a cloud based computing environment.

6. The computer-implemented model of claim 1, wherein the providing the notifications of applications employing pull model communications to the client comprises a visualization engine for preparing a report.

7. The computer-implemented method of claim 1, where the conversion to push model comprises sending further communications using Websocket communication protocol.

8. A system for determining network communication parameters comprising:
   a hardware processor; and
   a memory that stores a non-transitory computer program product, which, when executed by the hardware processor, causes the hardware processor to:
   analyze network packets at the communication endpoints to determine number of requests and responses;
   determine from the number of requests and responses which are follow up requests; characterizing the follow up requests as communications being performed with a pull model; and
   issue notifications of applications employing pull model communications with the client for conversion to push model for client/server call.

9. The system of claim 8, wherein selection of pull model or push model further comprises parameters comprising download speed, upload speed, and request frequency.

10. The system of claim 8, wherein the analyzing of network packets further comprising hashing to remove personal information from the network packets.

11. The system of claim 8, wherein the number of requests and responses are stored in a dictionary.

12. The system of claim 8, wherein the determining from the number of requests and responses which are the follow up requests includes determining repetition in the responses and requests.

13. The system of claim 8, wherein elements of the analyzing the network packets and determining the number of follow up requests is performed locally at the computing device of the client, and elements of the characterizing the follow up requests and the providing notifications of applications employing pull model communications to the client is performed in a cloud based computing environment.

14. The system of claim 8, wherein the providing the notifications of applications employing pull model communications to the client comprises a visualization engine for preparing a report.

15. The system of claim 8, where the conversion to push model comprises sending further communications using Websocket communication protocol.

16. A computer program product for determining network communication parameters comprising a computer readable storage medium having computer readable program code embodied therewith, the program instructions executable by a processor to cause the processor to:
   analyze, using the processor, network packets at the communication endpoints to determine number of requests and responses;
   determine, using the processor, from the number of requests and responses which are follow up requests;
   characterize, using the processor, the follow up requests as communications being performed with a pull model; and
   provide, using the processor, notifications of applications employing pull model communications with the client for conversion to push model for client/server call.

17. The computer program product of claim 16, wherein the analyzing of network packets further comprising hashing to remove personal information from the network packets.

18. The computer program product of claim 16, wherein the determining from the number of requests and responses which are the follow up requests includes determining repetition in the responses and requests.

19. The computer program product of claim 16, wherein elements of the analyzing the network packets and determining the number of follow up requests is performed locally at the computing device of the client, and elements of the characterizing the follow up requests and the providing notifications of applications employing pull model communications to the client is performed in a cloud based computing environment.

20. The computer program product of claim 16, wherein the conversion to push model comprises sending further communications using Websocket communication protocol.

* * * * *